US010357958B2

(12) United States Patent
Sakamoto et al.

(10) Patent No.: US 10,357,958 B2
(45) Date of Patent: Jul. 23, 2019

(54) INFORMATION PROCESSING APPARATUS, 3D PRINTER SYSTEM, INFORMATION PROCESSING METHOD, AND NON-TRANSITORY RECORDING MEDIUM

(71) Applicants: Tsuyoshi Sakamoto, Kanagawa (JP); Kohji Aragaki, Kanagawa (JP)

(72) Inventors: Tsuyoshi Sakamoto, Kanagawa (JP); Kohji Aragaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 288 days.

(21) Appl. No.: 15/260,468

(22) Filed: Sep. 9, 2016

(65) Prior Publication Data

US 2017/0072642 A1 Mar. 16, 2017

(30) Foreign Application Priority Data

Sep. 14, 2015 (JP) .................................. 2015-180923
Sep. 15, 2015 (JP) .................................. 2015-181795

(51) Int. Cl.
*B33Y 30/00* (2015.01)
*G06T 17/20* (2006.01)
*B33Y 50/00* (2015.01)

(52) U.S. Cl.
CPC ............... *B33Y 30/00* (2014.12); *B33Y 50/00* (2014.12); *G06T 17/20* (2013.01); *B29K 2995/0064* (2013.01)

(58) Field of Classification Search
CPC ......... B33Y 50/02; B33Y 50/00; B33Y 30/00; B29C 64/00; B29C 64/386; B29C 64/0088

USPC ............................................................ 700/98
See application file for complete search history.

(56) References Cited

U.S. PATENT DOCUMENTS

| 4,893,116 A * | 1/1990 | Henderson | G09G 5/022 345/591 |
| 4,920,483 A * | 4/1990 | Pogue | G06F 12/0207 711/219 |
| 6,717,575 B2 * | 4/2004 | Hino | G06T 15/60 345/418 |
| 8,175,734 B2 | 5/2012 | Fogel et al. | |
| 2004/0081340 A1 | 4/2004 | Hashimoto | |
| 2015/0029187 A1 * | 1/2015 | Nakamura | G06T 17/10 345/420 |
| 2015/0251357 A1 * | 9/2015 | Jin | G05B 15/02 700/119 |
| 2016/0019319 A1 * | 1/2016 | Shtilerman | G06T 17/10 264/308 |
| 2016/0136898 A1 * | 5/2016 | Jang | B29C 67/0088 700/98 |

(Continued)

FOREIGN PATENT DOCUMENTS

JP H09-091332 4/1997
JP 2000-298734 10/2000

(Continued)

*Primary Examiner* — Jason D Mitchell
(74) *Attorney, Agent, or Firm* — IPUSA, PLLC

(57) ABSTRACT

An information processing apparatus includes at least one processor configured to determine, for each of polygons that express a 3D shape, a color to be used when the polygon is projected, based on a position of the polygon with respect to a slice plane along a projecting direction in which the polygons are projected, and generate slice data that expresses a sectional shape of the 3D shape along the slice plane based on determined colors.

11 Claims, 15 Drawing Sheets

(56) References Cited

U.S. PATENT DOCUMENTS

2017/0148182 A1* 5/2017 Yoshida ................ B33Y 50/00
2018/0200958 A1* 7/2018 Tonouchi ............. B29C 64/393

FOREIGN PATENT DOCUMENTS

| JP | 2004-141514 | 5/2004 |
| JP | 3570138 | 9/2004 |
| JP | 2007-087329 | 4/2007 |
| JP | 2013-507679 | 3/2013 |
| JP | 2015-024631 | 2/2015 |

* cited by examiner

MDL

MDL          SLP

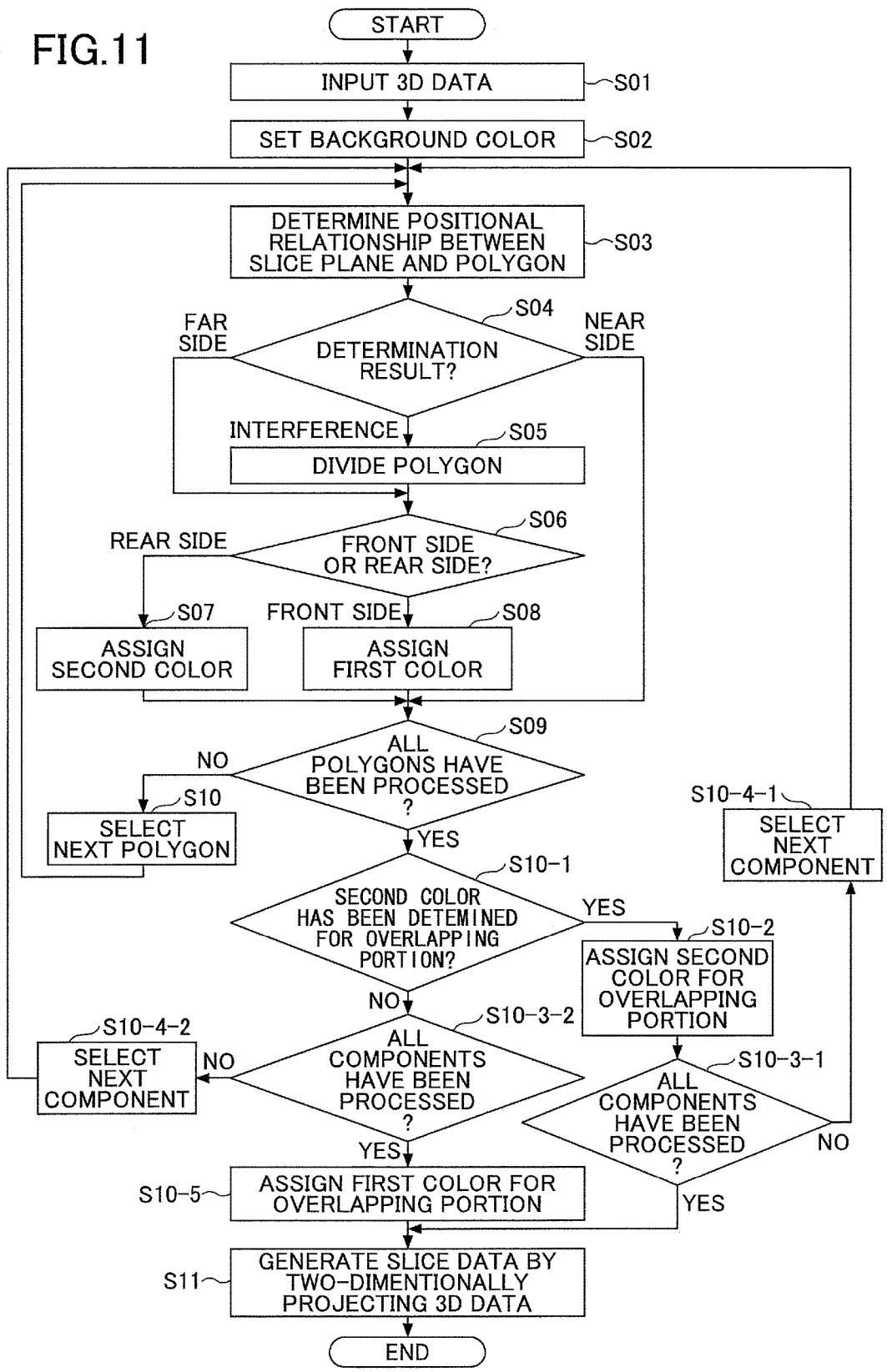

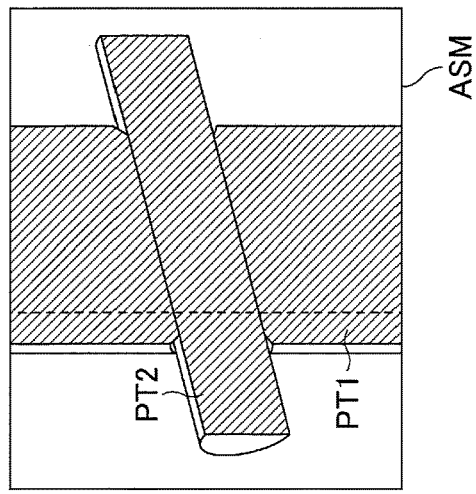
FIG.13E
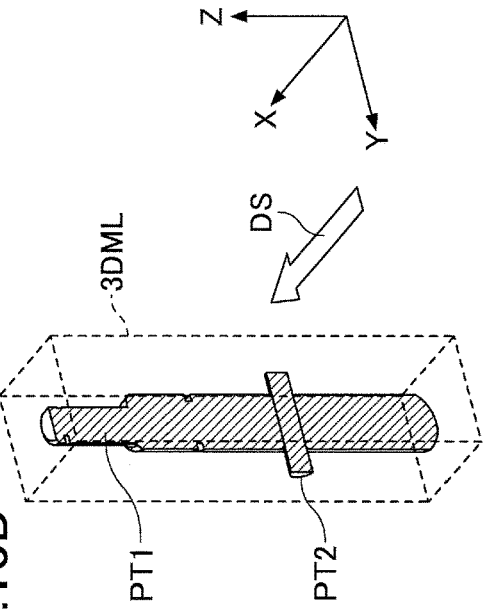
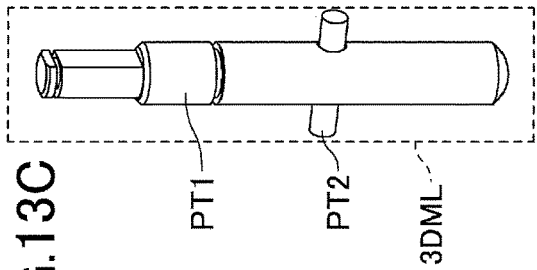
FIG.13C
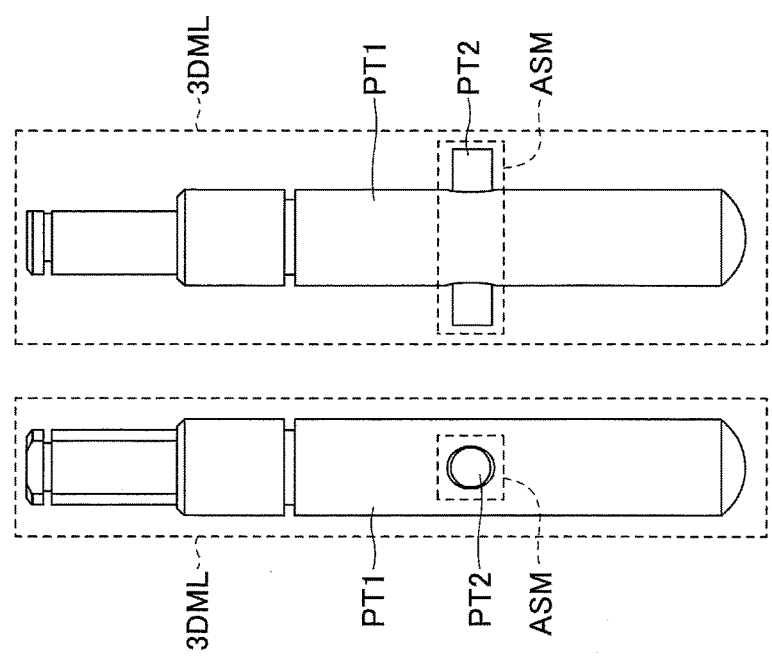
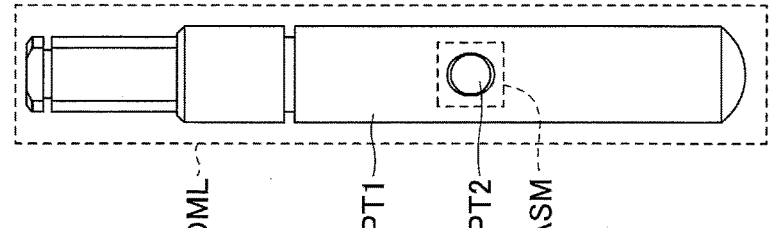
FIG.13A
FIG.13B
FIG.13D

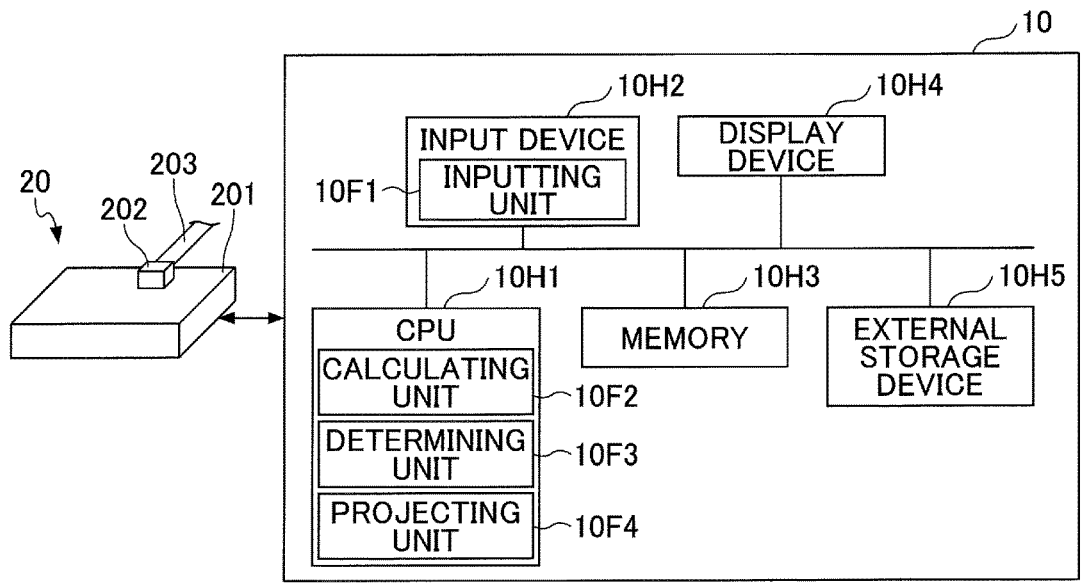
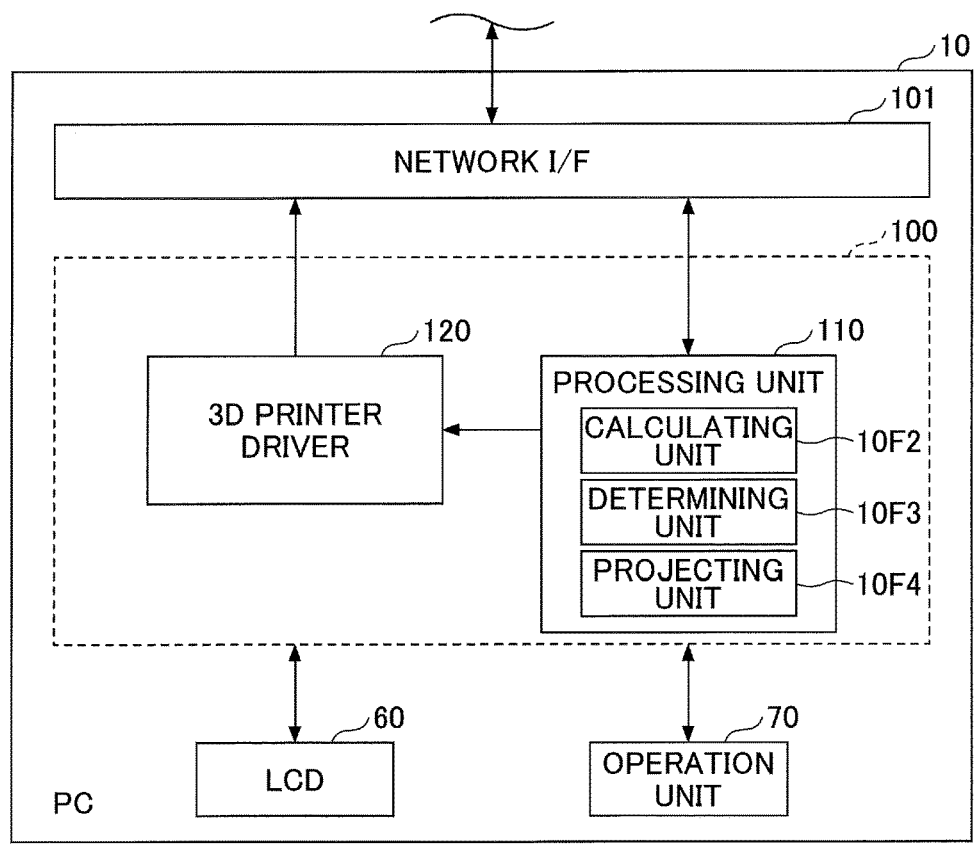

INFORMATION PROCESSING APPARATUS, 3D PRINTER SYSTEM, INFORMATION PROCESSING METHOD, AND NON-TRANSITORY RECORDING MEDIUM

CROSS-REFERENCE TO APPLICATIONS

The present patent application is based on and claims the benefit of priority of Japanese Priority Application No. 2015-180923, filed on Sep. 14, 2015 and Japanese Priority Application No. 2015-181795, filed on Sep. 15, 2015, the entire contents of which are hereby incorporated herein by reference.

BACKGROUND

1. Technical Field

The present invention relates to an information processing apparatus, a 3D printer system, an information processing method, and a non-transitory recording medium.

2. Description of the Related Art

A method has been known where 3D (three-dimensional) fabrication is carried out according to slice data generated based on 3D CAD (Computer Aided Design) data, or the like.

Also, a method of changing phase information of a polygon mesh when slice data is generated has been known. In the method, actually, first, when a polygon mesh is sliced, phase information of a polygon mesh is changed in such a manner as to be able to acquire a contour polygon line. Then, a contour polygon line is acquired from the changed polygon mesh, and the contour polygon line is changed in such a manner as to be able to normally paint out the inside of the acquired contour polygon line (for example, see Japanese Unexamined Patent Application No. 2015-24631).

SUMMARY

According to one aspect, an information processing apparatus includes at least one processor configured to determine, for each of polygons that express a 3D shape, a color to be used when the polygon is projected, based on a position of the polygon with respect to a slice plane along a projecting direction in which the polygons are projected, and generate slice data that expresses a sectional shape of the 3D shape along the slice plane based on determined colors.

Other objects, features, and advantages will become more apparent from the following detailed description when read in conjunction with the accompanying drawings.

BRIEF DESCRIPTION OF THE DRAWINGS

FIG. 11 is a flowchart illustrating one example of an overall process according to the second embodiment of the present invention;

FIGS. 13A-13E illustrates one example of a 3D shape that includes a plurality of components according to the second embodiment of the present invention;

FIG. 20 generally illustrates one example of a 3D printer according to any one of the first and second embodiments of the present invention; and FIG. 21 is a functional block diagram of an information processing apparatus in the 3D printer system according to any one of the first and second embodiments of the present invention.

DETAILED DESCRIPTION OF EMBODIMENTS

Figure 1:
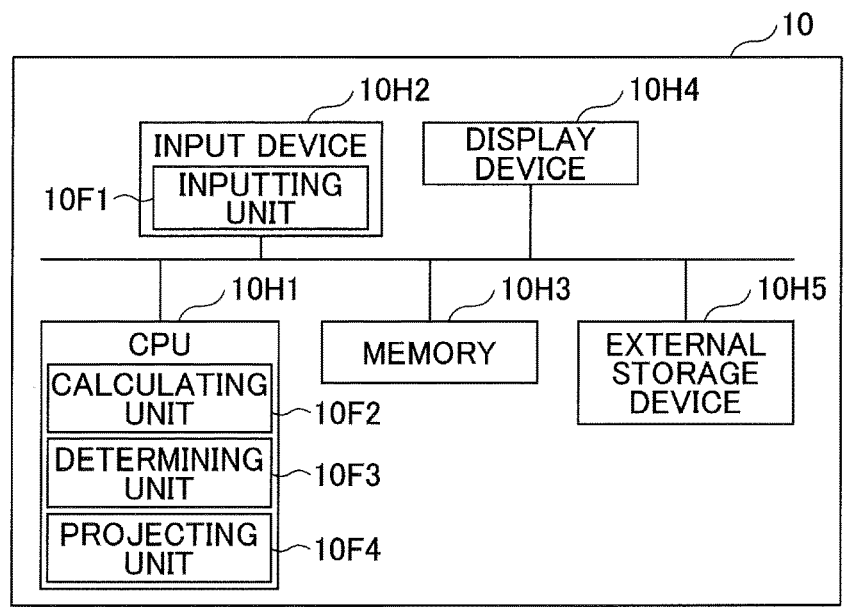
FIG. 1 is a block diagram illustrating one example of a hardware configuration of an information processing apparatus according to any one of first and second embodiments of the present invention.

In the above-described methods, it may be impossible to properly generate slice data if a 3D shape includes non-manifold geometry, interference, or the like.

The embodiments of the present invention have been devised in consideration of this point, and an object is to provide an information processing apparatus capable of properly generating slice data even if a 3D shape includes non-manifold geometry, interference, or the like.

Below, the embodiments of the present invention will be described with reference to the accompanying drawings. For elements having substantially the same functions in the description and drawings, the same reference numerals are given, and duplicate description will be omitted.

[First Embodiment]

<Example of Information Processing Apparatus>

First, one example of a hardware configuration of an information processing apparatus according to the first embodiment will be described.

FIG. 1 is a block diagram illustrating one example of a hardware configuration of an information processing apparatus 10 according to the first embodiment of the present invention. As illustrated, the information processing apparatus 10 is, for example, a PC (Personal Computer), or the like. Below, description will be made assuming an example where the information processing apparatus is a PC.

Actually, the PC 10 includes a CPU (Central Processing Unit) 10H1, an input device 10H2, a memory 10H3, a display device 10H4, and an external storage device 10H5. The PC 10 receives a user's operation that is input concerning CAD, and displays a model designed through CAD.

The CPU 10H1 includes an arithmetic unit and a control unit for executing a program.

The input device 10H2 includes, for example, a mouse, a keyboard, or a combination of a mouse and a keyboard. The input device 10H2 receives a user's operation input concerning CAD.

The memory 10H3 is one example of a main storage. The memory 10H3 stores a program, data, and so forth used by the CPU 10H1.

The display device 10H4 includes, for example, a display. The display device 10H4 displays a screen page concerning CAD.

The external storage device 10H5 includes, for example, an auxiliary storage such as a hard disk drive. The external storage device 10H5 stores a program, data, and so forth.

The hardware configuration of the PC 10 is not limited to the configuration illustrated in FIG. 1. For example, the PC 10 may have an interface to be connected to an external apparatus via a network, a cable, or the like, to input data or the like from the external apparatus and output data or the like to the external apparatus.

The PC 10 may further have hardware elements other than the hardware elements illustrated in FIG. 1. Also, the PC 10 may have, for example, an input and output device where the input device 10H2 and the display device 10H4 are integrated such as a touch panel.

<Example of Functional Configuration>

Figure 2:
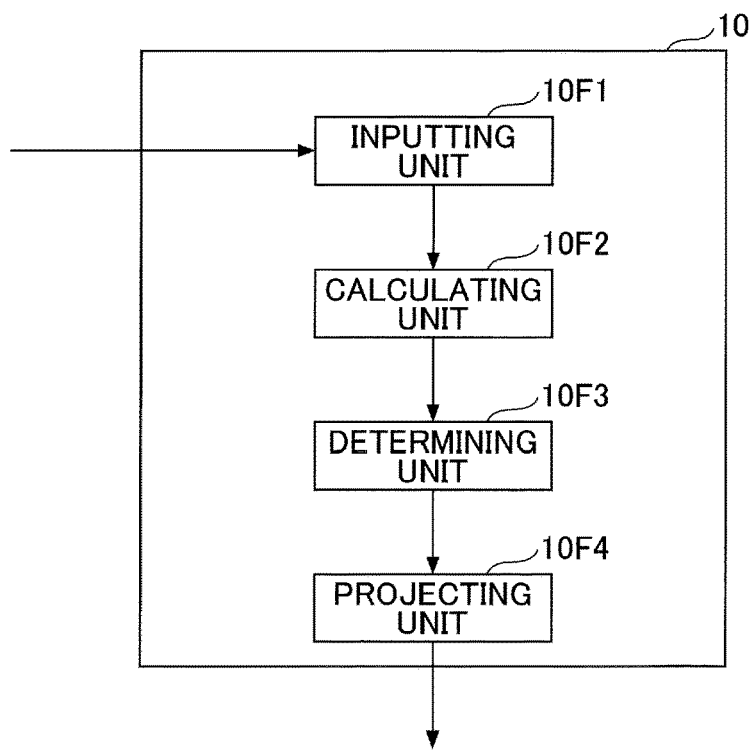
FIG. 2 is a functional block diagram illustrating the information processing apparatus according to the first embodiment of the present invention.

FIG. 2 is a functional block diagram illustrating the information processing apparatus 10 according to the first embodiment of the present invention. Actually, the PC 10 has an inputting unit 10F1, a calculating unit 10F2, a determining unit 10F3, and a projecting unit 10F4.

<Example of Inputting Unit>

The inputting unit 10F1 is used to input 3D data for generating slice data. Actually, the inputting unit 10F1 is implemented by the input device 10H2 (see FIG. 1), and so forth, and, for example, if a user's operation for designing 3D data or the like is input through the inputting unit 10F1, 3D data is generated.

<Example of Calculating Unit>

The calculating unit 10F2 calculates a distance along a visual-line direction between each polygon expressed by 3D data that is input through the inputting unit 10F1 with respect to a slice plane. Actually, the calculating unit 10F2 is implemented by the CPU 10H1 (see FIG. 1), and so forth, and calculates a distance between a slice plane that is set and each polygon. The visual-line direction is a direction (which may also be referred to as a "protecting direction" hereinafter) along which the projecting unit 10F4 two-dimensionally projects each polygon.

Figure 3:
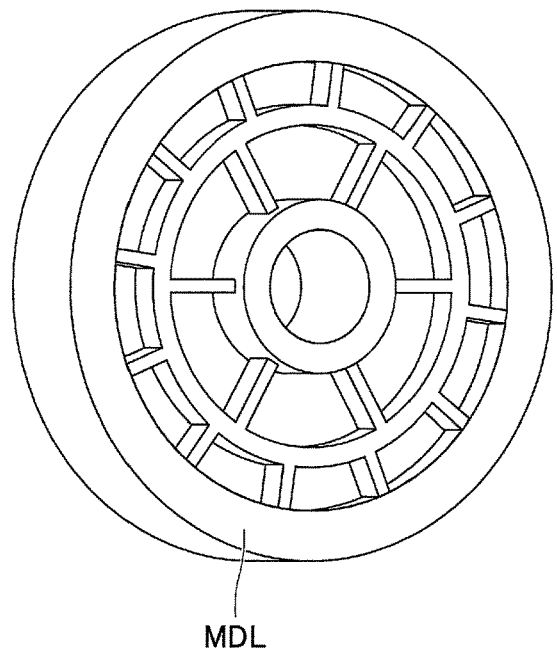
FIG. 3 illustrates a 3D shape according to any one of the first and second embodiments of the present invention.

FIG. 3 illustrates a 3D shape (which may be referred to as a model MDL hereinafter) expressed by the 3D data according to the first embodiment of the present invention. Below, description will be made assuming an example where 3D data that expresses a model MDL illustrated in FIG. 3 is input, for example, and the model MDL is expressed by a collection of polygons, or the like.

Figure 4:
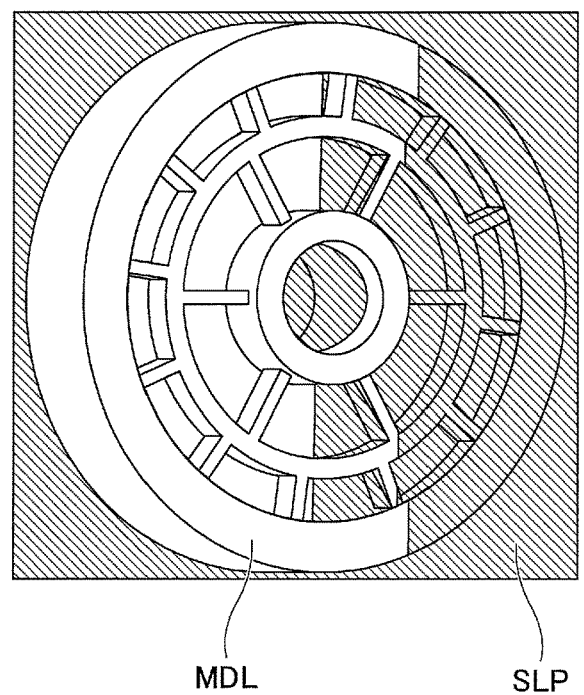
FIG. 4 illustrates a slice plane according to any one of the first and second embodiments of the present invention.

FIG. 4 illustrates a slice plane according to the first embodiment of the present invention. For a case where, for example, 3D data expressing the model MDL illustrated in FIG. 3 is input, and slice data will be generated, a slice plane SLP is set. The slice plane SLP is set, for example, as illustrated in FIG. 4, for the model MDL.

Figure 5A:
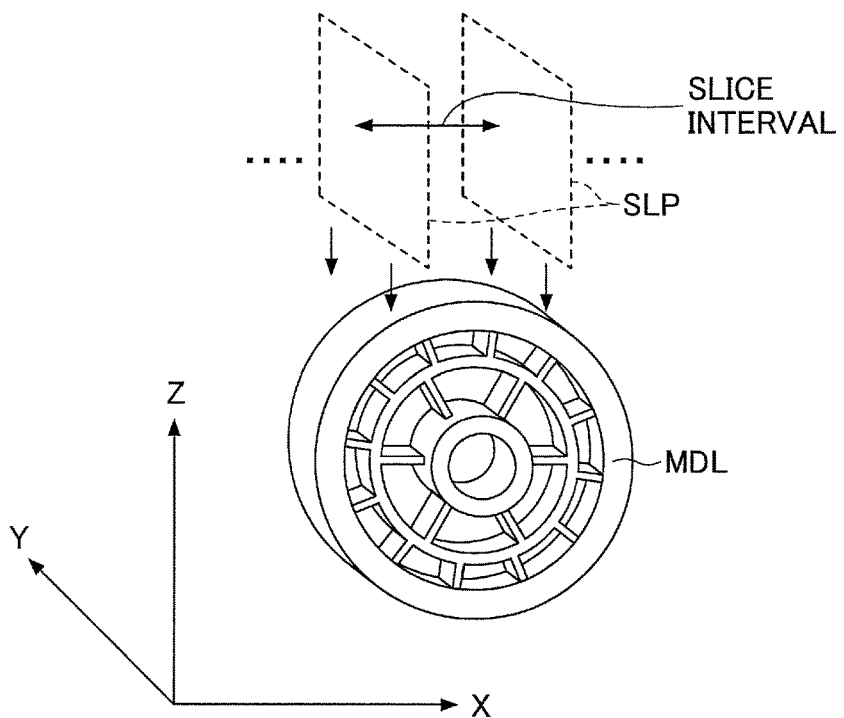
FIGS. 5A and 5B illustrate one example of a setting of slice planes according to any one of the first and second embodiments of the present invention.
Figure 5B:
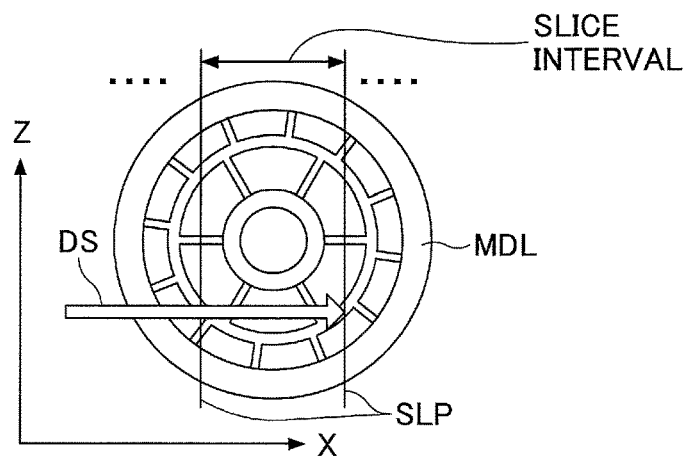

FIGS. 5A and 5B illustrate one example of setting slice planes according to the first embodiment of the present invention. In order to generate slice data, for example, as illustrated in FIG. 5A, the model MDL is placed in a 3D space expressed by an x-axis, a y-axis, and a z-axis, and slice planes SLP are set at predetermined slice intervals. In this example, as illustrated in FIG. 5B, slice planes SLP are set at slice intervals along the x-axis direction. As a result of the setting, slice data is generated at each slice interval.

Also, as illustrated in FIG. 5B, an example is assumed where a visual-line direction DS is orthogonal to each slice plane SLP.

However, the visual-line direction DS is not limited to a direction illustrated in FIG. 5B. For example, the visual-line direction DS may be set to be a direction different from the direction illustrated in FIG. 5B.

Figure 6:
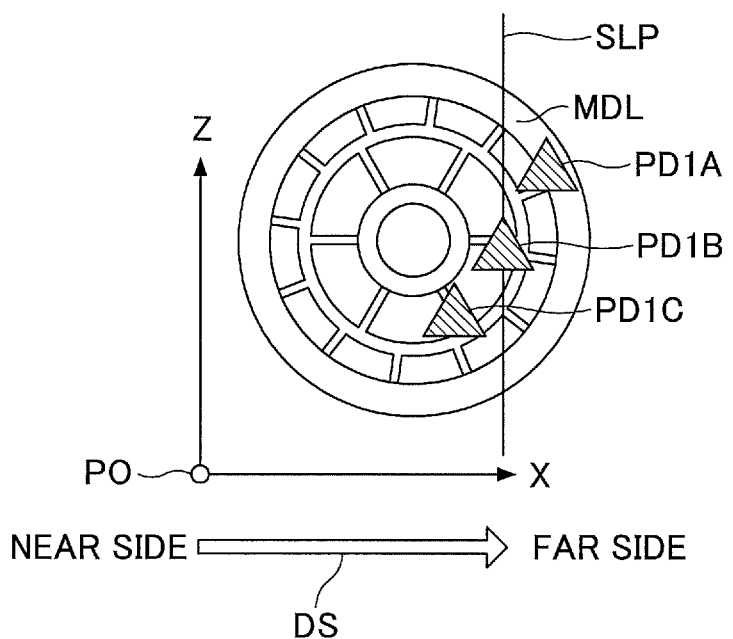
FIG. 6 illustrates one example of a positional relationship between a slice plane and a polygon according to any one of the first and second embodiments of the present invention.

FIG. 6 illustrates one example of a positional relationship between a slice plane SLP and a polygon according to the first embodiment of the present invention. Concerning FIG. 6, description will now be made assuming an example where a slice plane SLP and a visual-line direction DS such as the slice plane SLP and the visual-line direction DS illustrated in FIGS. 5A and 5B are set on the model MDL illustrated in FIGS. 5A and 5B.

The polygons that express the model MDL may include a first polygon PD1A illustrated in FIG. 6 on a far side of the slice plane SLP along the visual-line direction DS. Also, the polygons that express the model MDL may include a second polygon PD1B illustrated in FIG. 6 interfering with the slice plane SLP. Note that a case where a polygon interferes with a slice plane SLP may be a case where the polygon intersects the slice plane SLP. Also, the polygons that express the model MDL may include a third polygon PD1C illustrated in FIG. 6 on a near side of the slice plane SLP along the visual-line direction DS.

For example, the calculating unit 10F2 (see FIG. 2) calculates a distance of each polygon from the origin PO (see FIG. 6) along the x-axis direction, and calculates a distance of the slice plane SLP from the origin PO along the x-axis direction. As a result of calculating the respective distances along the x-axis direction, the PC 10 can compare the distance of each polygon from the origin PO along the x-axis direction and the distance of the slice plane SLP from the origin PO along the x-axis direction. Based on the calculation results, the PC 10 can determine whether each polygon is on a far side of the slice plane SLP, interferes with the slice plane SLP, or is on a near side of the slice plane SLP.

If it is determined, based on the calculation result of the calculating unit 10F2, that the polygon interferes with the slice plane SLP, the PC 10 divides the polygon. Actually, the PC 10 divides the polygon into one or more polygons on the far side of the slice plane SLP (hereinafter, referred to as "far-side polygons") and one or more polygons on the near side of the slice plane SLP (hereinafter, referred to as "near-side polygons").

Figure 7A:
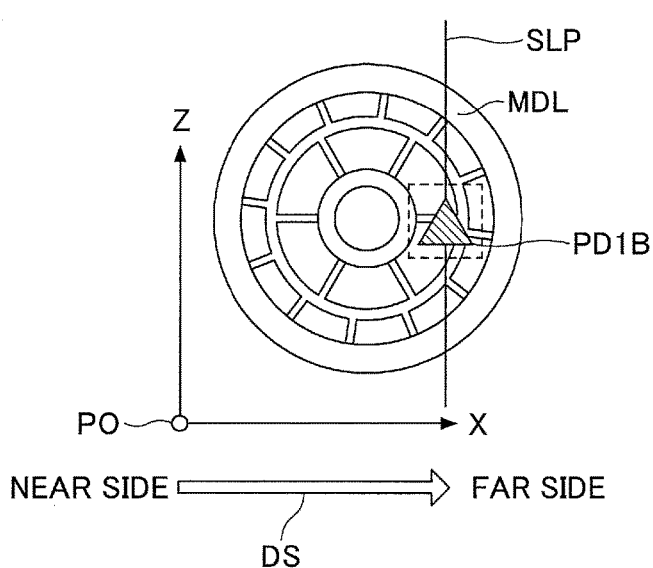
FIGS. 7A-7C illustrates one example of a manner to divide a polygon according to any one of the first and second embodiments of the present invention.
Figure 7B:
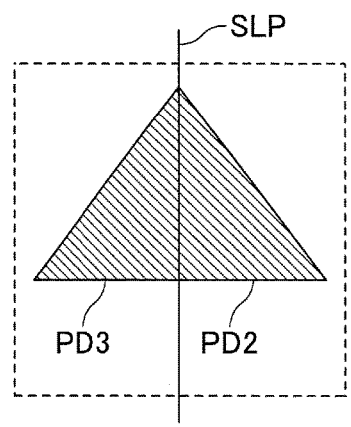
Figure 7C:
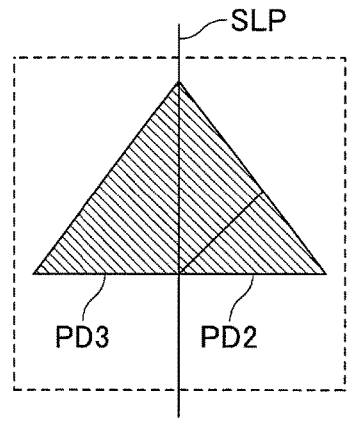

In this regard, FIGS. 7A-7C illustrates one example of a manner to divide a polygon according to the first embodiment of the present invention. Now, description will be made assuming an example where, as illustrated in FIG. 7A, the polygons that expresses the model MDL includes the second polygon PD1B illustrated in FIG. 6.

If there is a polygon such as the second polygon PD1B interfering with the slice plane SLP, the PC 10 divides the polygon, as illustrated in FIG. 7B, for example. Actually, the PC 10 divides the second polygon PD1B illustrated in FIG. 7A into a far-side polygon PD2 and a near-side polygon PD3, as illustrated in FIG. 7B. As illustrated, the far-side polygon PD2 is a division of the polygon PD1B on the far side of the slice plane SLP. On the other hand, the near-side polygon PD3 is a division of the polygon PD1B on the near side of the slice plane SLP.

Thus, the PC 10 can divide the interfering polygon into the far-side polygon PD2 and the near-side polygon PD3. Thus, the PC 10 can reduce interfering polygons.

Note that an actual manner of dividing an interfering polygon is not limited to the above-mentioned manner of dividing the interfering polygon into the single far-side polygon PD2 and the single near-side polygon PD3. It is also possible to divide the interfering polygon into one or more far-side polygons PD2 and one or more near-side polygons PD3. For example, as illustrated in FIG. 7C, the far-side polygons PD2 may include two polygons.

In a subsequent process, the far-side polygon PD2 generated from dividing the interfering polygon will be treated as a polygon on the far side of the slice plane SLP along the visual-line direction DS. In the same way, in a subsequent process, the near-side polygon PD3 generated from dividing the interfering polygon will be treated as a polygon on the near side of the slice plane SLP along the visual-line direction DS.

<Example of Determining Unit>

Returning to FIG. 2, the determining unit 10F3 determines a color to be used when the projecting unit 10F4 projects the polygon based on the calculation result of the calculating unit 10F2. Note that the determining unit 10F3 is implemented by the CPU 10H1 (see FIG. 1) and so forth. Actually, based on the calculation result of the calculating unit 10F2, if the polygon is determined as being on the far side of the slice plane SLP, the determining unit 10F3 determines a color to be used when the projecting unit 10F4 projects the polygon based on whether the polygon faces opposite to a projecting direction or faces the projecting direction.

A "polygon that faces opposite to the projecting direction" means a polygon that faces a direction opposite to the visual-line direction DS (i.e., the projecting direction) (i.e., faces an eye at which the visual line originates). A "polygon that faces the projecting direction" means a polygon that faces the visual-line direction DS (i.e., faces opposite to the eye at which the visual line originates).

"Polygons that face opposite to the projecting direction" include not only polygons that squarely face the eye at which the visual line originates but also polygons that obliquely face the eye at which the visual line originates and are visible from the eye. In the same way, "polygons that face the projecting direction" include not only polygons that squarely face opposite to the eye at which the visual line originates but also polygons that obliquely face opposite to the eye at which the visual line originates and are not visible from the eye. Also, a "polygon that faces opposite to the projecting line" is also referred to as a "polygon that expresses a front side" and a "polygon that faces the projecting line" is also referred to as a "polygon that expresses a rear side".

Actually, if the polygon is on the far side of the slice plane SLP and faces opposite to the projecting direction, the determining unit 10F3 determines that the color used when the polygon is projected to be the color (hereinafter, referred to as a "first color") same as a background color used when the polygons are projected. If the polygon is on the far side of the slice plane SLP and faces the projecting direction, the determining unit 10F3 determines that the color used when the polygon is projected to be a color (hereinafter, referred to as a "second color") different from the first color. That is, the second color is different from the background color.

Note that the first color and the second color may be colors that exclude shade. For example, by excluding an influence of a light source, it is possible to exclude shade.

If it is determined based on the calculation result of the calculating unit 10F2 that the polygon is on the near side of the slice plane SLP, the determining unit 10F3 carries out restriction such as preventing the polygon from being projected.

<Example of Projecting Unit>

The projecting unit 10F4 two-dimensionally projects the respective polygons expressed by the 3D data with the corresponding colors determined by the determining unit 10F3 to generate slice data. Actually, the projecting unit 10F4 is implemented by the CPU 10H1 (see FIG. 1) and so forth, and two-dimensionally projects the respective polygons to generate slice data.

Note that there may be a plurality of polygons on the far side of the slice plane SLP overlapping along the projecting direction when the polygons are projected along the projecting direction (i.e., the x direction) two-dimensionally on a y-z plane, because of, for example, unevenness of the 3D shape. In such a case, the color determined for the nearest polygon from among the polygons on the far side of the slice plane SLP is used for the overlapping area.

The slice data is two-dimensional data such as data of a bitmap (BMP) format, for example, for expressing the sectional shape of the 3D shape along the slice plane in a binary manner. That is, the slice data is data where, for example, the first color is expressed by "0", and the second color is expressed by "1". However, the slice data is not limited to BMP data, and may be data of any format as long as data having a format compatible with the specification of a 3D printer to which the slice data is output.

Figure 8:
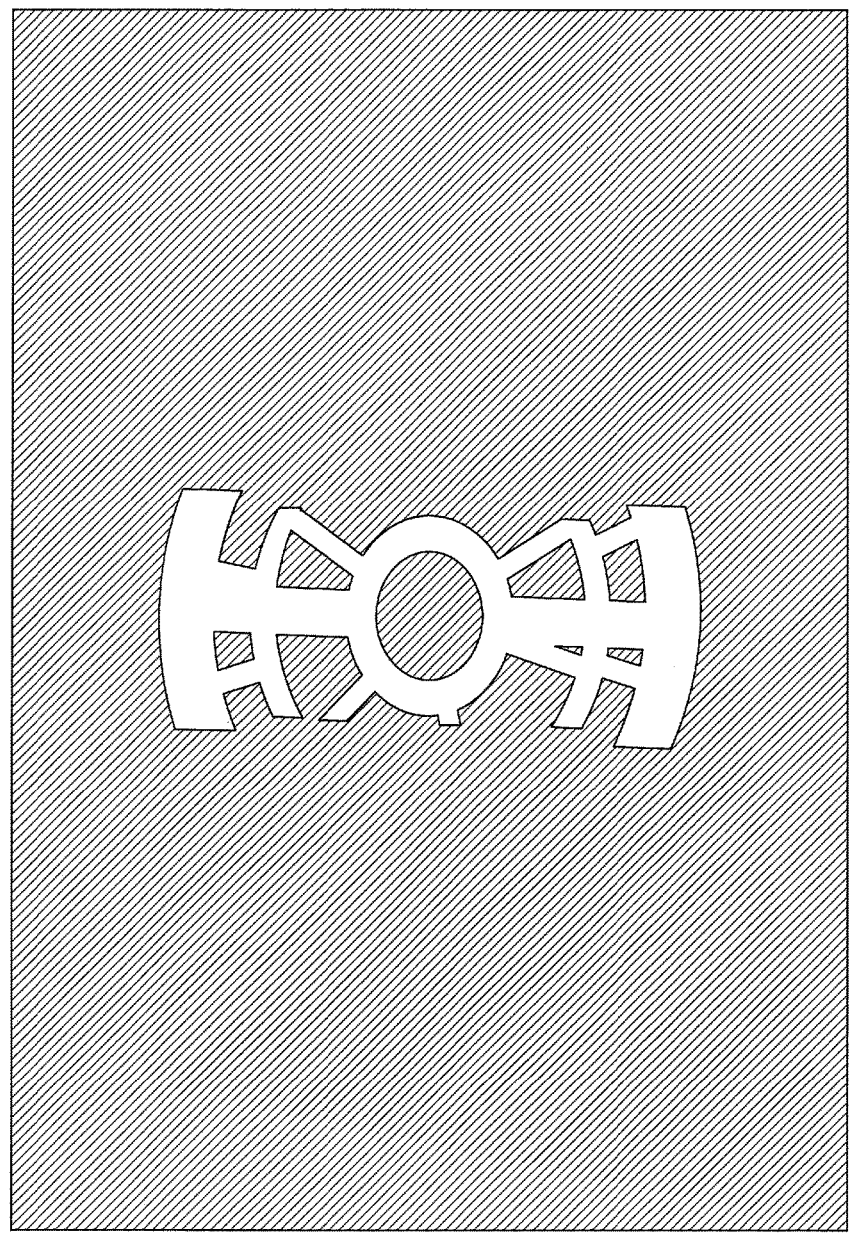
FIG. 8 illustrates one example of slice data according to any one of the first and second embodiments of the present invention.

FIG. 8 illustrates one example of the slice data according to the first embodiment of the present invention. The slice data illustrated in FIG. 8 is acquired when, as illustrated in FIG. 4, the slice plane SLP is set on the model MDL. In the slice data of this example, the background and the polygons that are on the far side of the slice plane SLP and face opposite to the projecting direction are expressed by the first color. Actually, as illustrated in FIG. 8, the first color is determined as black. Note that for the convenience sake, black is expressed by hatching in FIG. 8. On the other hand, in the slice data of this example, the polygons that are on the far side of the slice plane SLP and face the projecting direction are expressed by the second color. Actually, as illustrated in FIG. 8, the second color is determined as white.

If the slice data such as that illustrated in FIG. 8 is output to a 3D printer, or the like, the 3D printer, or the like, can carry out 3D fabrication based on the slice data taken at each of a plurality of slice planes SLP.

<Example of Overall Process>

Figure 9:
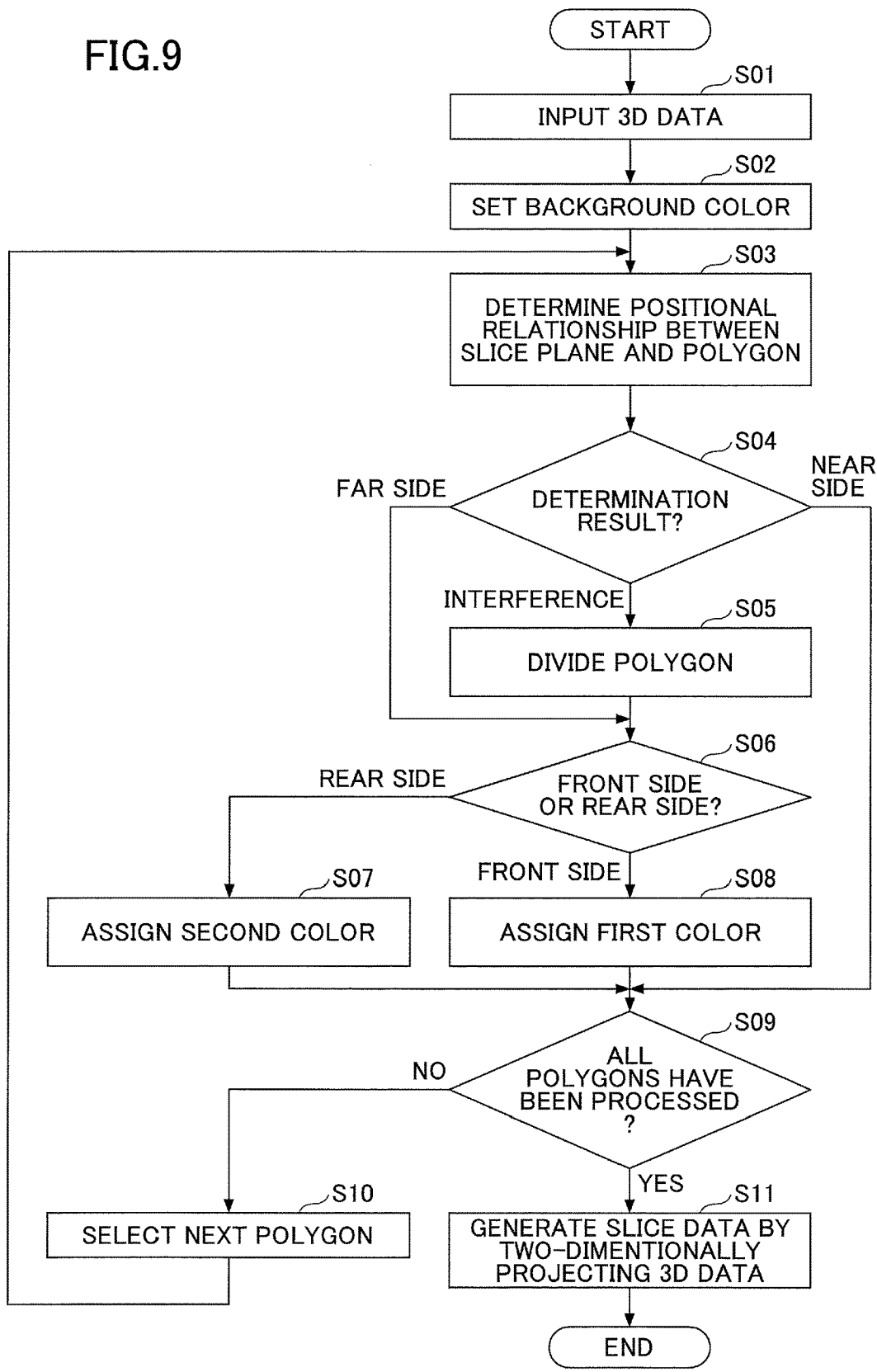
FIG. 9 is a flowchart illustrating one example of an overall process according to the first embodiment of the present invention.

FIG. 9 is a flowchart illustrating one example of an overall process according to the first embodiment of the present invention.

In step S01, 3D data is input to the PC 10.

In step S02, a background color is set on the PC 10. That is, a first color is set in step S02. Also, in step S02, a color different from the first color is set as a second color on the PC 10. The first color and the second color may be previously set as initial values.

In step S03, the PC 10 determines a positional relationship between a given slice plane, and a given polygon of the polygons expressed by the 3D data.

In step S04, the PC 10 acquires the determination result of step S03, i.e., whether the polygon is on the far side of the slice plane, is on the near side of the slice plane, or interferes with the slice plane.

If the determination result acquired in step S04 is that the polygon is on the far side of the slice plane ("far side" of step S04), the PC 10 proceeds to step S06. If the determination result acquired in step S04 is that the polygon interferes with the slice plane ("interference" of step S04), the PC 10 proceeds to step S05. If the determination result acquired in step S04 is that the polygon is on the near side of the slice plane ("near side" of step S04), the PC 10 proceeds to step S09.

As illustrated in FIG. 9, if it is determined that the polygon is on the near side of the slice plane, the PC 10 skips steps S07 and S08 where the color is determined for the polygon, to carry out restriction so as to not project the polygon.

In step S05, the PC 10 divides the polygon determined to interfere with the slice plane into far-side polygons and near-side polygons. Then, the PC 10 carries out step S06 on the far-side polygons generated from dividing the interfering polygon.

In step S06, the PC 10 determines, based on data associated with the polygon, whether the polygon faces opposite to the projecting direction (i.e., the polygon expresses a front side) or faces the projecting direction (i.e., the polygon expresses a rear side). If the PC 10 determines that the polygon faces opposite to the projecting direction (i.e., the polygon expresses a front side) ("front side" in step S06), the PC 10 proceeds to step S08. If the PC 10 determines that the polygon faces the projecting direction (i.e., the polygon expresses a rear side) ("rear side" in step S06), the PC 10 proceeds to step S07.

In step S07, the PC 10 determines the color to be used when the polygon is projected to be the second color.

In step S08, the PC 10 determines the color to be used when the polygon is projected to be the first color.

In step S09, the PC 10 determines whether all the polygons expressed by the 3D data have been processed. If the PC 10 determines that all the polygons have been processed (YES in step S09), the PC 10 proceeds to step S11. If the PC 10 determines that all the polygons have not been processed yet (NO in step S09), the PC 10 proceeds to step S10. That is, the PC 10 carries out steps S03-S08 repetitively to process all the polygons expressed by the 3D data.

In step S10, the PC 10 selects a next polygon of the polygons expressed by the 3D data.

In step S11, the PC 10 two-dimensionally projects the polygons expressed by the 3D data along the projecting direction to generate slice data concerning the slice plane using the colors determined in steps S07 and S08.

Note that the slice plane and the projecting direction are set by the user or have been previously set as initial values, for example.

[Second Embodiment]

The second embodiment of the present invention will now be described.

<Example of Information Processing Apparatus>

A hardware configuration example of an information processing apparatus according to the second embodiment of the present invention can be the same as or similar to the hardware configuration example of the information processing apparatus according to the first embodiment of the present invention described above with reference to FIG. 1. Therefore, duplicate description will be omitted.

<Functional Configuration Example>

Figure 10:
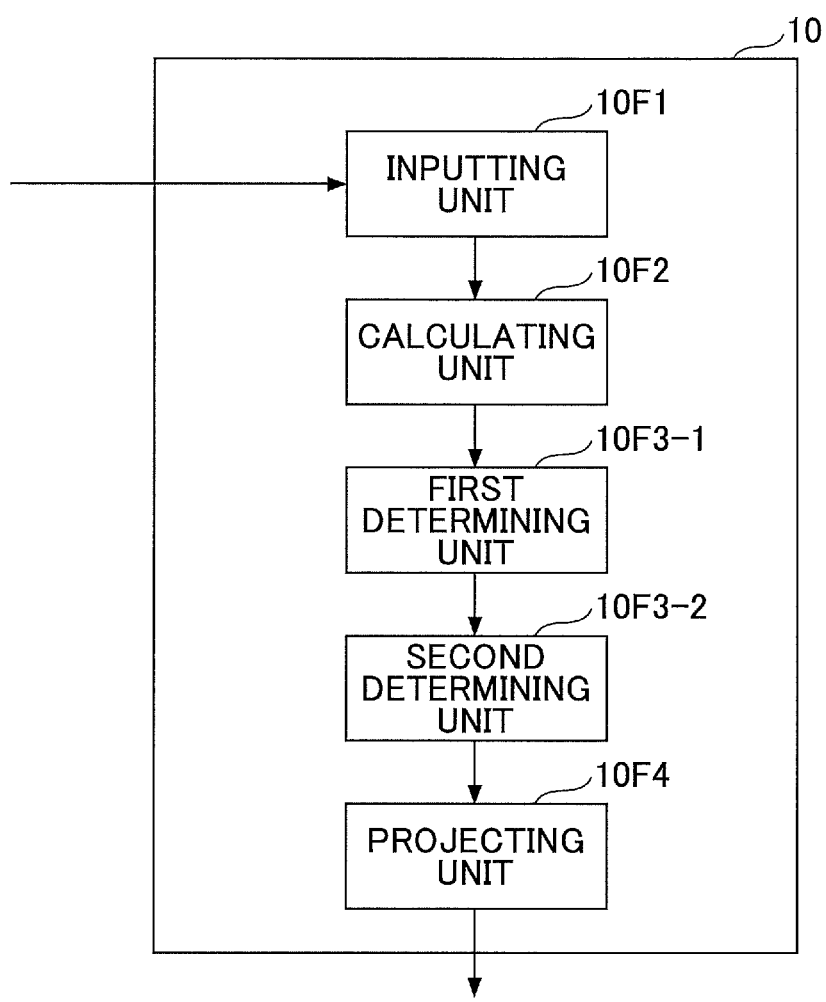
FIG. 10 is a functional block diagram illustrating the information processing apparatus according to the second embodiment of the present invention.

FIG. 10 is a functional block diagram illustrating one example of the information processing apparatus according to the second embodiment of the present invention. What is different from the functional configuration example of the information processing apparatus according to the first embodiment described above with reference to FIG. 2 is that, instead of the determining unit 10F3, a first determining unit 10F3-1 and a second determining unit 10F3-2 are included. The inputting unit 10F1, the calculating unit 10F2 and the first determining unit 10F3-1 may be the same as or similar to the inputting unit 10F1, the calculating unit 10F2, and the determining unit 10F3 of the information processing apparatus according to the first embodiment, respectively. Therefore, duplicate description will be omitted.

<Example of Second Determining Unit>

In a case where a 3D shape has a plurality of components among which polygons spatially overlap, the second determining unit 10F3-2 determines the color for the overlapping portion to be the second color if the first determining unit 10F3-1 determines the second color for the overlapping portion concerning any component even if the first determining unit 10F3-1 determines the first color for the overlapping portion concerning another component.

The second determining unit 10F3-2 is implemented by the CPU 10H1 (see FIG. 1) and so forth. Actually, if a plurality of determinations concerning respective components for the overlapping portion where polygons overlap among the components by the first determining unit 10F3-1 includes at least one determination to use the second color, the second determining unit 10F3-2 determines the second color for the overlapping portion.

That is, the second determining unit 10F3-2 finally determines a color based on a plurality of determination results of the first determining unit 10F3-1 acquired for an overlapping portion concerning respective components. For example, the second determining unit 10F3-1 determines either one of the first color and the second color, for example, according to Table 1 below.

TABLE 1

|  |  | DETERMINATION RESULT FOR FIRST COMPONENT | |
|  |  | FIRST COLOR | SECOND COLOR |
| --- | --- | --- | --- |
| DETERMINATION RESULT FOR SECOND COMPONENT | FIRST COLOR | FIRST COLOR | SECOND COLOR |
|  | SECOND COLOR | SECOND COLOR | SECOND COLOR |

As illustrated in Table 1 above, the second determining unit 10F3-2 determines to use the second color for an overlapping portion if the first determining unit 10F3-1 determines at least once to use the second color from among a plurality of determinations concerning respective components. On the other hand, the second determining unit 10F3-2 determines to use the first color for the overlapping portion if the first determining unit 10F3-1 determines to use the first color in each of a plurality of determinations concerning the respective components. Note that the determination of a color to be used when a polygon is projected is made in pixel units, for example.

As illustrated in Table 1 above, the second determining unit 10F3-2 may make the determination through a logical OR operation carried out on determination results of the second color. Actually, for example, if the first determining unit 10F3-1 determines to use the second color for an overlapping portion concerning any component from among components among which polygons overlap, the PC 10 assigns "1" to the determination result. On the other hand, if the first determining unit 10F3-1 determines to use the first color for the overlapping portion concerning any component from among the components among which polygons overlap, the PC 10 assigns "0" to the determination result. Then, the second determining unit 10F3-2 carries out a logical OR operation on the respective determination results of the first determining unit 10F3-1 for the overlapping portion concerning the components. Thus, as illustrated in Table 1, if the determination result of the first determining unit 10F3-1 concerning any component is to use the second color, i.e., there is a determination result "1", the second determining unit 10F3-2 can determine the second color for the overlapping portion.

<Example of Projecting Unit>

Returning to FIG. 10, the projecting unit 10F4 two-dimensionally projects the respective polygons expressed by the 3D data with the corresponding colors determined by the second determining unit 10F3-2 to generate slice data. Actually, the projecting unit 10F4 is implemented by the CPU 10H1 (see FIG. 1) and so forth, and two-dimensionally projects the respective polygons to generate slice data.

The slice data is two-dimensional data such as data of a bitmap (BMP) format, for example, for expressing the slice plane in a binary manner. That is, the slice data is data where, for example, the first color is expressed by "0", and the second color is expressed by "1". However, the slice data is not limited to BMP data, and may be data of any format as long as data having a format compatible with the specification of a 3D printer to which the slice data is output.

To the projecting unit 10F4, data is input based on the colors determined by the second determining unit 10F3-2.

FIG. 8 illustrates also one example of the slice data according to the second embodiment of the present invention. The slice data illustrated in FIG. 8 is acquired when, as illustrated in FIG. 4, the slice plane SLP is set on the model MDL. In the slice data of this example, the background and the polygons that are on the far side of the slice plane SLP and face opposite to the projecting direction are expressed by the first color. Actually, as illustrated in FIG. 8, the first color is determined as black. On the other hand, in the slice data of this example, the polygons that are on the far side of the slice plane SLP and face the projecting direction are expressed by the second color. Actually, as illustrated in FIG. 8, the second color is determined as white.

When the slice data such as that illustrated in FIG. 8 is output to a 3D printer, or the like, the 3D printer, or the like, can carry out 3D fabrication based on the slice data taken for a plurality of slice planes SLP.

<Example of Overall Process>

FIG. 11 is a flowchart illustrating one example of an overall process according to the second embodiment of the present invention.

What is different from the overall process according to the first embodiment described with reference to FIG. 9 is that steps S10-1, S10-2, S10-3-1, S10-4-1, S10-3-2, S10-4-2, and S10-5 are added. Steps S01-S10 can be the same as or similar to steps S01-S10 in the overall process according to the first embodiment. Therefore, duplicate description will be omitted.

In a case where the 3D shape expressed by the 3D data includes a plurality of components, when all of the polygons have been processed concerning a given component of the components (YES in step S09), the PC10 proceeds to step S10-1.

In step S10-1, the PC 10 determines whether the second color has been determined for an overlapping portion where polygons overlap among corresponding components of the components. Note that, in step S07 or step S08, a color has been determined concerning the component. In step S10-1, the PC 10 determines whether the second color has been determined in step S07 or S08 for the overlapping portion concerning the component. If the second color has been determined for the overlapping portion concerning the component (YES in step S10-1), the PC 10 proceeds to step S10-2. If the first color has been determined for the overlapping portion concerning the component (NO in step S10-1), the PC 10 proceeds to step S10-3-2.

In step S10-2, the PC 10 determines the second color for the overlapping portion. Then, the PC 10 proceeds to step S10-3-1.

In step S10-3-1, the PC 10 determines whether all the components have been processed. If all the components have not been processed yet (NO in step S10-3-1), the PC 10 selects a subsequent component of the components, in step S10-4-1, and then, proceeds to step S02. If all the components have been processed (YES in step S10-3-1), the PC 10 proceeds to step S11.

In step S10-3-2, the PC 10 determines whether all the components have been processed. If all the components have not been processed yet (NO in step S10-3-2), the PC 10 selects a subsequent component of the components, in step S10-4-2, and then, proceeds to step S02. If all the components have been processed (YES in step S10-3-2), the PC 10 proceeds to step S10-5.

A fact that all of the components have been processed without determination of the second color for the overlapping portion (i.e., without acquiring YES in step S10-1) means that, for the overlapping portion, the second color has not been determined in any of the determinations, i.e., the first color has been determined for the overlapping portion concerning all of the corresponding components (NO in step S10-1). Therefore, the PC 10 determines the first color for the overlapping portion in step S10-5. Then, the PC 10 proceeds to step S11.

In step S11, the PC 10 projects the polygons expressed by the 3D data two-dimensionally to generate slice data concerning the slice plane using the colors determined in steps S07, S08, S10-2, and S10-5.

In the 3D shape expressed by the 3D data, concerning the portions other than the overlapping portion, the colors determined in steps S07 and S08 are used as they are.

Note that the slice plane and the visual-line direction are set by the user or previously set as initial values, or the like.

If the 3D shape includes a plurality of the above-mentioned overlapping portions, the PC 10 determines colors for each overlapping portion concerning the corresponding components. Then, if the second color is determined one or more times in the respective determinations, the PC can determine the second color for the overlapping portion. If the first color is determined in all of the determinations, the PC can determine the first color for the overlapping portion.

<Actual Example>

Figure 12A:
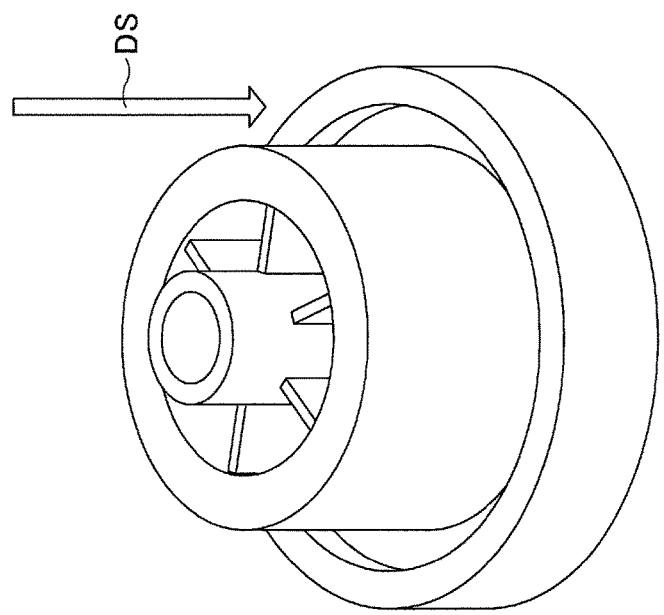
FIGS. 12A and 12B illustrate one example of a slice plane and a visual-line direction according to any one of the first and second embodiments of the present invention.
Figure 12B:
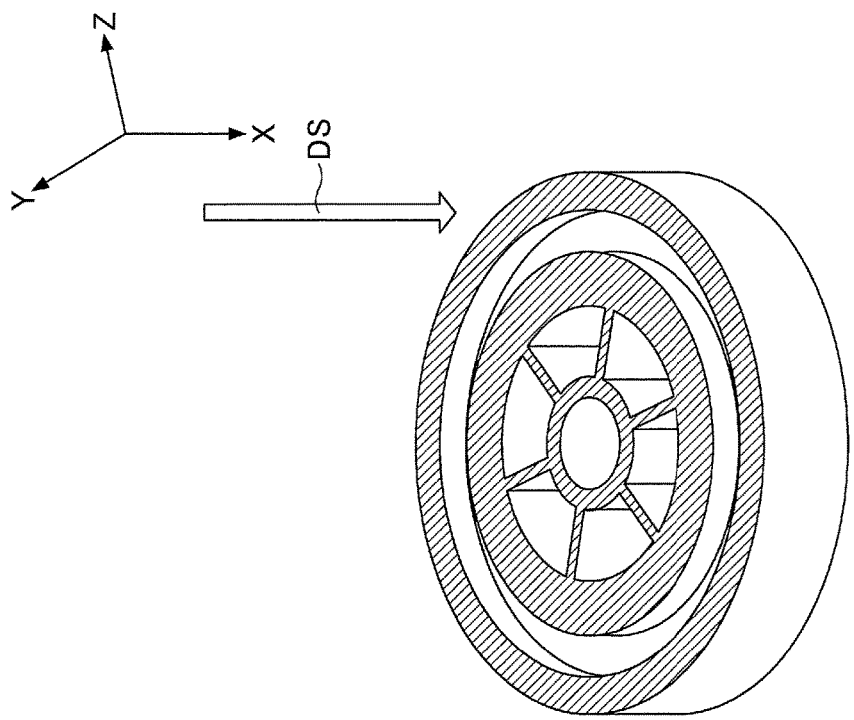

FIGS. 12A and 12B illustrate one example of setting a slice plane and a visual-line direction according to any one of the first and second embodiments of the present invention. For example, it is assumed that 3D data of a 3D shape illustrated in FIG. 12A is input. In this example, first, a visual-line direction DS is set by a user, for example. Also, as a setting concerning slice planes, slice intervals, and so forth, are set. As a result of the settings concerning slice planes and a visual-line direction being performed, positions, angles, and so forth, at which slice planes are to be generated, are determined. Then, for example, it is possible to set a slice plane with which it is possible to see a sectional shape (i.e., hatched areas) illustrated in FIG. 12B of a 3D shape illustrated in FIG. 12A.

If the process illustrated in any one of FIGS. 9 and 11 is carried out, the PC 10 can generate slice data such as slice data illustrated in FIG. 8. In contrast to the embodiments of the present invention, according to a method for generating slice data by acquiring a sectional line of a 3D shape at a slice plane through geometric computation, or the like, it may be impossible to properly acquire the sectional line if the 3D shape has non-manifold geometry or autointerference. Therefore, it may be impossible to properly generate slice data.

On the other hand, according to any one of the first and second embodiments of the present invention, the PC 10 determines a positional relationship between a slice plane and a polygon along a visual-line direction. Based on the determination result, a color to be used when the projecting unit 10F4 (see FIG. 2) projects the polygon is determined. Then, the PC 10 projects the polygons expressed by the 3D data two-dimensionally to generate slice data, based on the determined colors. Thus, the PC 10 can properly generate slice data even if there is non-manifold geometry, interference, or the like.

That is, according to any one of the first and second embodiments of the present invention, even if a 3D shape has mismatching such as overlapping or separation between some of polygons that express the 3D shape, the PC 10 can properly generate slice data. Also, according to any one of the first and second embodiments of the present invention, it may be possible to improve processing speed concerning the computation.

In particular, a 3D shape may have non-manifold geometry, interference, or the like in a very small portion in many cases. Therefore, when there is non-manifold geometry, interference, or the like, it may be impossible to properly generate slice data in a method of acquiring a sectional line at a slice plane of a 3D shape using geometric computation. In contrast to the method, according to any one of the first and second embodiments of the present invention, the PC 10 can properly generate slice data based on 3D data even if there is non-manifold geometry, interference, or the like. Therefore, it is possible to properly carry out 3D fabrication through a 3D printer, or the like, even if there is non-manifold geometry, interference, or the like.

As mentioned above, a 3D shape may include a plurality of components.

FIGS. 13A-13E illustrates one example of a 3D shape that includes a plurality of components according to the second embodiment of the present invention. Below, description will be made with reference to a 3D shape illustrated in FIGS. 13A-13F as an example. Note that, FIG. 13A illustrates a side view of the 3D shape, and FIG. 13B illustrates a front view of the 3D shape.

Also, FIG. 13C illustrates a perspective view of the 3D shape. FIG. 13D illustrates a cross-sectional view taken from FIG. 13C. FIG. 13E illustrates a partial magnified view taken from FIG. 3D.

As can be seen from FIGS. 13A-13E, the 3D shape (hereinafter, referred to as a 3D model) includes a first component PT1 and a second component PT2. In this example, there is an assembly portion ASM where assembly is made in such a manner that the second component PT2 passes through a through hole formed in the first component PT1. Note that in the assembly portion ASM, for example, such a design is made that the diameter of the second component PT2 is larger than the inner diameter of the through hole of the first component PT1 for the purpose of achieving fitting between the components.

In such an example, because the second component PT2 has the diameter larger than the inner diameter of the through hole of the first component PT1 in the 3D model 3DML, the second component PT2 spatially overlaps with the first component PT1. Therefore, in many cases, it may be determined that, in the 3D model 3DML, so-called interference occurs.

A case where it is determined that interference occurs is not limited to the case such as a case illustrated in FIGS. 13A-13E.

Figure 14A:
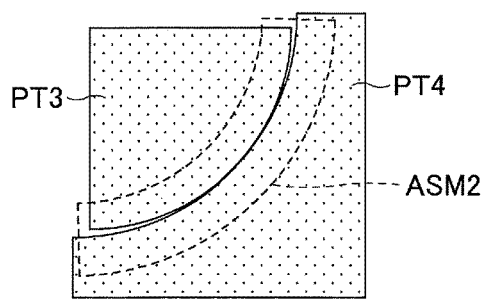
FIGS. 14A and 14B illustrate examples of cases where interference occurs among a plurality of components according to the second embodiment of the present invention.
Figure 14B:
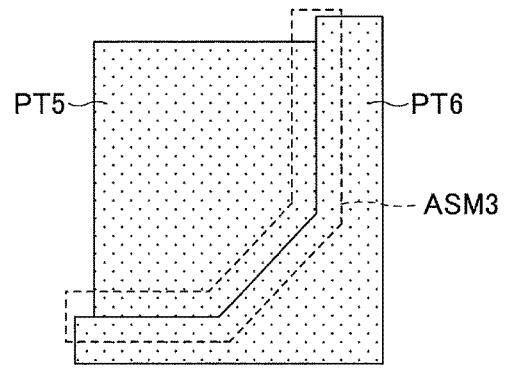

FIGS. 14A and 14B illustrate examples of cases where interference occurs among a plurality of components according to the second embodiment of the present invention. For example, as illustrated in FIG. 14A, when such assembly is made that a third part PT3 and a fourth part PT4 that have curved surfaces come into contact with one another, it may be determined that interference occurs in an assembly portion ASM2.

Also, for example, as illustrated in FIG. 14B, when such assembly is made that a fifth part PT5 and a sixth part PT6 come into contact with one another, it may be determined that interference occurs in an assembly portion ASM3.

Therefore, if a 3D model includes a plurality of components, or the like, it may be determined that interference occurs. Even in such a case, by carrying out the process illustrated in FIG. 11, for example, it is possible to properly generate slice data.

Figure 15:
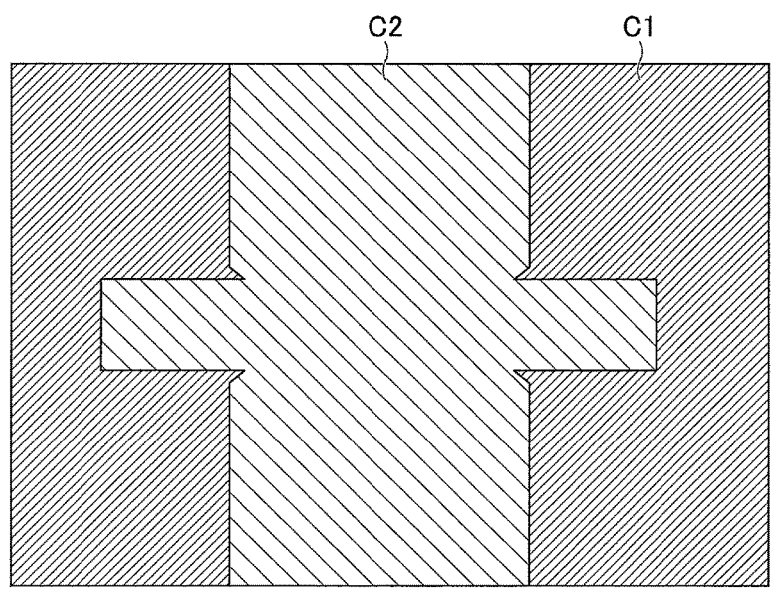
FIG. 15 illustrates one example of slice data of a 3D shape that includes a plurality of components according to the second embodiment of the present invention.

FIG. 15 illustrates one example of slice data of a 3D shape that includes a plurality of components according to the second embodiment of the present invention. FIG. 15 illustrates one example of slice data including an assembly portion such as the assembly portion ASM illustrated in FIGS. 13A, 13B, and 13E. Even if such an assembly portion ASM where, because there are a plurality of components, it may be determined that interference occurs in many cases, is included, the PC 10 can properly generate slice data such as slice data illustrated in FIG. 15.

In FIGS. 15-18 illustrating slice data, a portion for which it is determined to use the second color C2 is expressed by coarse hatching. On the other hand, a portion for which it is determined to use the first color C1 is expressed by fine hatching.

Figure 16:
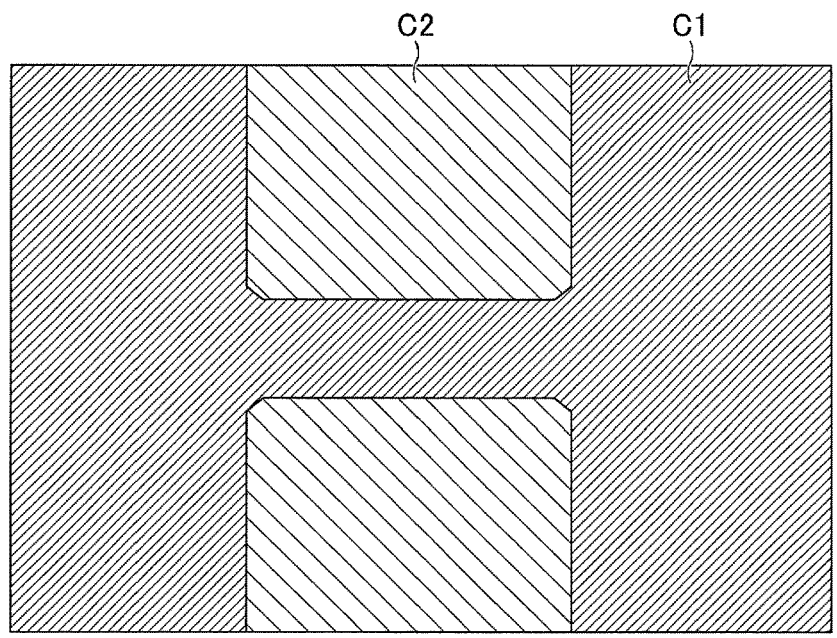
FIG. 16 illustrates one example of slice data of a first component according to the second embodiment of the present invention.

FIG. 16 illustrates one example of slice data of the first component PT1 according to the second embodiment of the present invention. In a 3D model 3DML, if the first component PT1 illustrated in FIGS. 13A-13D is a sole component, i.e., if there is not the second component PT2, slice data illustrated in FIG. 16 can be generated for the assembly portion ASM.

Figure 17:
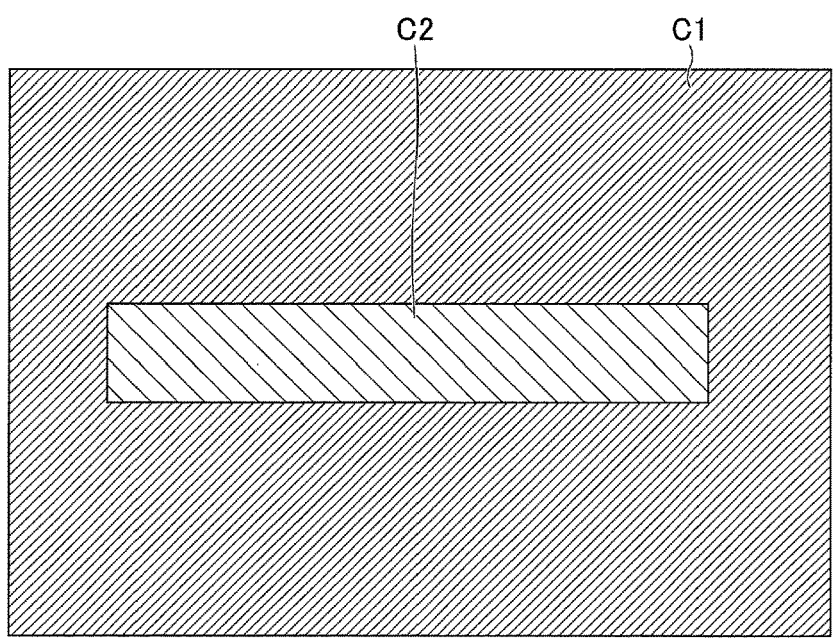
FIG. 17 illustrates one example of slice data of a second component according to the second embodiment of the present invention.

FIG. 17 illustrates one example of slice data of the second component PT2 according to the second embodiment of the present invention. In a 3D model 3DML, if the second component PT2 illustrated in FIGS. 13A-13D is a sole component, i.e., if there is not the first component PT1, slice data illustrated in FIG. 17 can be generated for the assembly portion ASM.

Therefore, the PC 10 can generate slice data of a combination of the slice data of FIG. 16 and the slice of FIG. 17, as illustrated in FIG. 15, by carrying out the process of FIG. 11. Thus, the PC 10 can generate slice data where a cavity, or the like, is eliminated, by combining respective determination results acquired for the components, even if there is non-manifold geometry, interference, or the like.

Note that the PC 10 can carry out the process of FIG. 11 on a 3D model that includes three or more components. Actually, if a 3D model that includes three or more components is processed, steps S03 through S10-1 may be repeated for each of the components. Then, based on the determination result for each of the components, steps S10-2 and S11, or steps S10-5 and S11 are carried out.

Steps S10-1 and S10-2, or step S10-1 and S10-5 can be carried out after steps S03-S10 have been completed on all of the components.

<Comparison Example>

Figure 18:
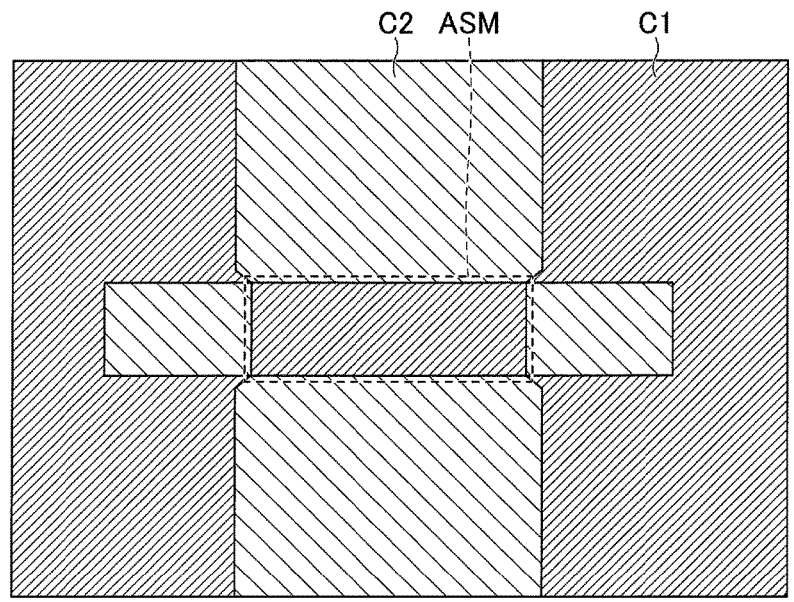
FIG. 18 illustrates one example of slice data of a 3D shape that includes a plurality of components according to a comparison example.

FIG. 18 illustrates one example of slice data of a 3D shape that includes a plurality of components according to a comparison example. That is, FIG. 18 illustrates an example of slice data generated using a method different from the process illustrated in FIG. 11 concerning the 3D model 3DML illustrated in FIGS. 13A-13E. If there is non-manifold geometry, interference, or the like, as an assembly portion ASM illustrated in FIG. 18, there may be a case where a portion to be determined to use the second color is determined to use the first color. If such slice data is used by a 3D printer to carry out 3D fabrication, the assembly portion ASM may have a cavity.

<Example of 3D Printer System>

Figure 19:
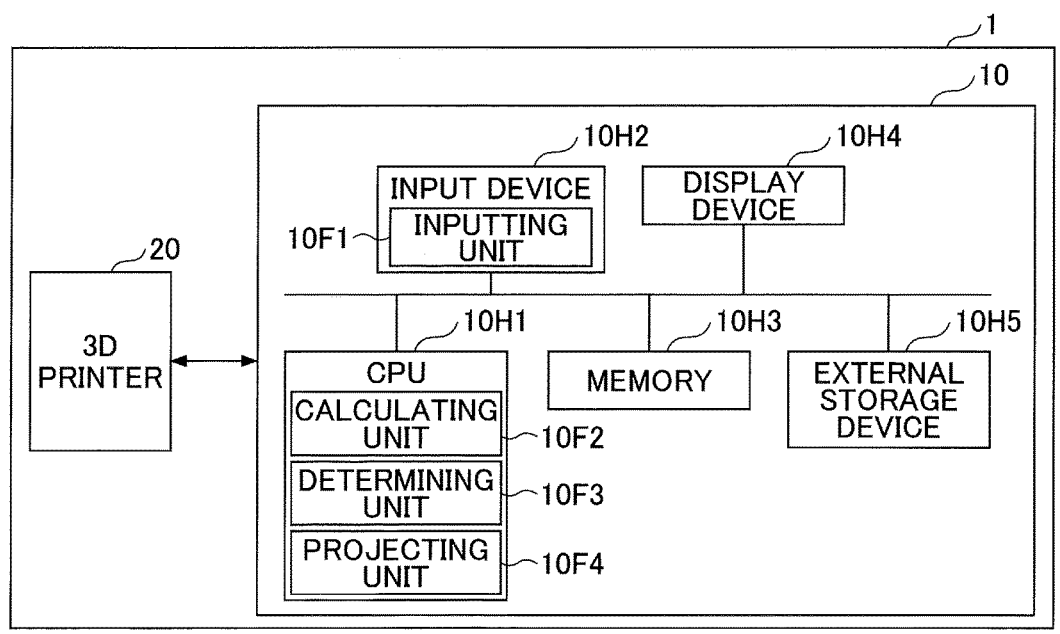
FIG. 19 generally illustrates one example of a 3D printer system according to any one of the first and second embodiments of the present invention.

FIG. 19 generally illustrates one example of a 3D printer system according to any one of the first and second embodiments of the present invention. As illustrated in FIG. 19, a 3D printer system 1 has a PC 10 and a 3D printer 20.

The 3D printer 20 has a head that fires liquid droplets. Also, the 3D printer 20 receives data that is transmitted from the PC 10, and forms a 3D object by stacking layers formed by firing molding material droplets from the head based on the received data. The PC 10 can be the information processing apparatus 10 illustrated in FIG. 1, or the like.

FIG. 20 generally illustrates one example of a 3D printer according to any one of the first and second embodiments of the present invention. As illustrated in FIG. 20, the 3D printer 20 can have a configuration that is, for example, the same as or similar to a common liquid-droplet-firing-type 3D printer. Actually, the 3D printer 20 includes a substrate 201 on which layers of a molding material are stacked for forming a 3D object, a head 202 that fires molding material droplets, and an arm 203 that supports the head 202 and moves the head 202 in a space above the substrate 201.

The 3D printer 20 carries out 3D fabrication for each layer according to slice data transmitted from the PC 10 illustrated in FIG. 19 by firing molding material droplets from the head 202. Thus, the 3D printer 20 carries out 3D fabrication by stacking layers.

The 3D printer 20 has an information processing function that is the same as or similar to the information processing function of the PC 10 illustrated in FIG. 19. The 3D printer 20 is controlled by the PC 10 through the information processing function of the 3D printer 20 itself. Also, the 3D printer 20 controls a movement of the arm 203, firing the molding material droplets from the head 202, and so forth through a control unit implemented by the information processing function.

FIG. 21 is a functional block diagram of the information processing apparatus 10 in the 3D printer system according to any one of the first and second embodiments of the present invention. As can be seen from FIG. 21, the PC 10 includes a controller 100 and a network I/F 101 in addition to a LCD 60 and an operation unit 70 implemented by the input device 10H2, the display device 10H4, and so forth, illustrated in FIG. 1. The network I/F 101 is one example of an interface for the PC 10 to carry out communications with another apparatus via a network, and can be an Ethernet (registered trademark) interface, a USB (Universal Serial Bus) interface, or the like.

The controller 100 can be implemented by a combination of software and hardware, or the like, and functions as a control unit that controls the entirety of the PC 10. As can be seen from FIG. 21, the controller 100 includes a processing unit 110 and a 3D printer driver 120 that provides a function for the PC 10 to control the 3D printer 20.

The processing unit 110 carries out any one of the process illustrated in FIG. 9 and the process illustrated in FIG. 11 to generate slice data from 3D data that is input. First, in step S01 of the process illustrated in FIG. 9 or FIG. 11, for example, 3D data is input to the PC 10 via a network or the like. Thus, the processing unit 110 acquires the 3D data. Note that it is also possible that, when a user performs an operation on the operation unit 70, the processing unit 110 acquires data through a file path designated by the operation.

The processing unit 110 generates slice data from the input 3D data through a process illustrated in FIG. 9, a process illustrated in FIG. 11, or the like. Then, the processing unit 110 analyzes a space surrounding a 3D object to be formed according to the 3D data that is input. There is a case where, as a result of the analysis, a supporting member is added to support the 3D object because a bottom of the 3D object is not in contact with the substrate 201 and there is a gap between the 3D object and the substrate 201. In such a case, the processing unit 110 previously adds data concerning the supporting member to the original 3D data. In order to implement the processing unit 110 that carries out such a process, a software program is used.

The 3D printer driver 120 is a software module for driving the 3D printer 20 by the PC 10, and can have a function that is the same as or similar to common 3D printer driver software. For example, the 3D printer driver 120 conforms to a function of a printer driver of a common paper sheet printer, to generate slice data or the like for driving the 3D printer 20 based on 3D data that is input, and transmit the slice data or the like to the 3D printer 20 together with control data.

<Summary of Embodiments>

As can be seen from the above descriptions, the information processing apparatus and the 3D printer system according to the first embodiment carries out the following processes.

(i) The calculating unit determines a positional relationship between polygons expressed by 3D data that is input through the inputting unit and a slice plane for slice data along a visual-line direction that may be perpendicular to the slice plane.

(ii) The determining unit determines a color to be used when projecting each polygon based on the determination result of the calculating unit.

(iii) The projecting unit projects the polygons expressed by the 3D data two-dimensionally based on the respective colors determined by the determining unit.

Thus, according to the first embodiment of the present invention, the calculating unit determines a positional relationship along a visual-line direction between a slice plane and each of the polygons expressed by the 3D data that is input through the inputting unit. Based on the determination result, the determining unit determines a color. Then, the projecting unit projects the polygons expressed by the 3D data two-dimensionally with the respective colors determined by the determining unit, to generate slice data. Thus, even if there is non-manifold geometry, interference, or the like, it is possible to properly generate slice data.

The information processing apparatus and the 3D printer system according to the second embodiment carries out the following processes.

(i) The calculating unit determines a positional relationship between polygons expressed by 3D data that is input through the inputting unit and a slice plane for slice data along a visual-line direction that may be perpendicular to the slice plane.

(ii) The first determining unit determines respective colors to be used when projecting the polygons based on the determination results of the calculating unit concerning each component.

(iii) The second determining unit determines, for an overlapping portion where polygons overlap among components, to use the second color if the second color is determined to use in any one of the determinations for the overlapping portion concerning the respective components by the first determining unit.

(iv) The projecting unit projects the polygons expressed by the 3D data two-dimensionally based on the respective colors determined by the second determining unit for the overlapping portion. The projecting unit projects the polygons expressed by the 3D data two-dimensionally based on the respective colors determined by the first determining unit for the other portions.

Thus, according to the second embodiment of the present invention, the calculating unit determines a positional relationship along a visual-line direction between a slice plane and each of polygons expressed by the 3D data that is input through the inputting unit. Based on the determination result, the first determining unit determines a color concerning each component. Then, the second determining unit determines the second color to be used for an overlapping portion when the second color is determined to use in any one of the determinations made for the overlapping portion concerning the respective components by the first determining unit. Then, the projecting unit projects the polygons expressed by the 3D data two-dimensionally with the respective colors determined by the second determining unit for the overlapping portion, to generate slice data. The projecting unit projects the polygons expressed by the 3D data two-dimensionally with the respective colors determined by the first determining unit for the other portions, to generate slice data.

Therefore, even if the first determining unit determines, for an overlapping portion, the first color to use concerning any component due to non-manifold geometry, interference, or the like, the second determining unit can finally determine the second color to use when the second color is determined to use one or more times concerning other components for the overlapping portion.

A 3D printer or the like may stop 3D fabrication concerning a portion determined to use the first color in slice data, and, as a result, the portion may become a cavity. On the other hand, for a portion determined to use the second color, a 3D printer or the like carries out 3D fabrication. Therefore, if, due to non-manifold geometry, interference, or the like, a portion to be determined to use the second color is determined to use the first color, a cavity that is not included according to a design, or the like, may be generated.

However, according to the second embodiment of the present invention, for an overlapping portion, the second determining unit can determine to use the second color if the second color is determined to use concerning any component. Therefore, even if there is non-manifold geometry, interference, or the like, it is possible to properly generate slice data.

Note that all or part of the respective processes in any of the first and second embodiments of the present invention can be implemented by a program described by a low-order language such as an assembler, a high-order language such as C, C++, C#, Java (registered trademark), or object oriented language, or the like. The program is a computer program for causing a computer or computers of an information processing apparatus or an information processing system that includes one or more information processing apparatuses to carry out the respective processes.

Also, the program can be distributed in a form of being stored in a computer readable recording medium. The recording medium may be an EPROM (Erasable Programmable ROM), a flash memory, a flexible disk, an optical disc such as a Blu-ray disc, a SD (Secure Digital) (registered trademark) card, a MO (Magneto-Optic disc), or the like. Also, the program can be distributed via a telecommunications circuit.

Also, the information processing system can have two or more information processing apparatuses mutually connected via a network or the like, and all or part of the respective processes can be carried out by the information processing apparatuses in a distributing manner, a parallel manner, or a redundancy manner.

According to any of the first and second embodiments of the present invention, even if there is non-manifold geometry, interference, or the like, it is possible to properly generate slice data.

Thus, the information processing apparatuses, the 3D printer systems, the information processing methods, and the non-transitory recording media have been described in the embodiments. However, embodiments are not limited to the above-described embodiments, and various modifications and replacements may be made.

What is claimed is:
1. An information processing apparatus comprising:
at least one processor configured to: include:
a first determining unit configured to determine, for each of a plurality of polygons, a color to be used when each of the polygons is projected, based on a distance between a position of each of the polygons and a slice plane, said distance being calculated by the at least one processor,
a second determining unit configured to determine, for each of the plurality of polygons, the color to be used when each of the polygons is projected, based on the distance between the position of each of the polygons and the slice plane, and a projecting unit configured to two-dimensionally project each of the plurality of polygons in a color determined for each of the plurality of polygons, wherein the first determining unit is further configured to:
define a first color as a color that is a same as a background color and a second color as a color that is different from the background color, determine a color to be used for a polygon that is located at a near side of the slice plane to be the first color;

classify the polygons that are located on a far side of the slice plane along the projecting direction into polygons that are not viewable and facing in the projecting direction and polygons that are viewable and facing in a direction opposite to the projecting direction;

determining a color to be used for the polygons that are facing in the projecting direction to be the first color;

determining a color to be used for the polygons that are facing in the direction opposite to the projecting direction to be the second color, wherein the second determining unit is further configured to:
when a three-dimensional shape includes a plurality of components and the polygons overlap with each other at the plurality of components, if the first determining unit determines a color to be used for at least one of the overlapped plurality of components to be the second color and a color to be used for a rest of the overlapped plurality of components to be the first color, determine the color to be for the overlapped plurality of components to be the second color.

2. The information processing apparatus according to claim 1, wherein
the at least one processor is further configured to:
restrict projection of the polygon that is on a near side of the slice plane along the projecting direction.

3. The information processing apparatus according to claim 1, wherein
the at least one processor is further configured to:
generate the slice data by two-dimensionally projecting the respective polygons based on the determined colors.

4. The information processing apparatus according to claim 3, wherein
the at least one processor is further configured to:
use a color determined for a nearest polygon of polygons on a far side of the slice plane along the projecting direction concerning an overlapping area where the polygons overlap along the projecting direction on the far side of the slice plane.

5. The information processing apparatus according to claim 1, wherein
the at least one processor is further configured to:
restrict projection of the polygon that is on a near side of the slice plane along the projecting direction.

6. The information processing apparatus according to claim 1, wherein
the at least one processor is further configured to:
generate the slice data by two-dimensionally projecting the respective polygons based on the determined colors.

7. The information processing apparatus according to claim 6, wherein
the at least one processor is further configured to:
use a color determined for a nearest polygon of polygons on a far side of the slice plane along the projecting direction for an area where the polygons overlap along the projecting direction.

8. The information processing apparatus according to claim 1, wherein the at least one processor is configured to:
generate the slice data that expresses a sectional shape of the 3D shape along the slice plane directly from the 3D data and determined colors without generating a contour line of the 3D shape.

9. A 3D printer system comprising:
at least one information processing apparatus configured to generate slice data; and
a 3D printer configured to carry out 3D fabrication using the generated slice data,
wherein the at least one information processing apparatus includes at least one processor include:
a first determining unit configured to configured to:
determine, for each of a plurality of polygons, a color to be used when each of the polygons is projected, based on a distance between a position of each of the polygons and a slice plane, said distance being calculated by the at least one processor, a second determining unit configured to determine, for each of the plurality of polygons, the color to be used when each of the polygons is projected, based on the distance between the position of each of the polygons and the slice plane, and a projecting unit configured to two-dimensionally project each of the plurality of polygons in a color determined for each of the plurality of polygons, wherein the first determining unit is further configured to:
define a first color as a color that is a same as a background color and a second color as a color that is different from the background color, determine a color to be used for a polygon that is located at a near side of the slice plane being determined to be the first color;

classify the polygons that are located on a far side of the slice plane along the projecting direction into polygons that are not viewable and facing in the projecting direction and polygons that are viewable and facing in a direction opposite to the projecting direction;

determining a color to be used for the polygons that are facing in the projecting direction to be the first color;

determining a color to be used for the polygons that are facing in the direction opposite to the projecting direction to be the second color, wherein the second determining unit is further configured to:
when a three-dimensional shape includes a plurality of components and the polygons overlap with each other at the plurality of components, if the first determining unit determines a color to be used for at least one of the overlapped plurality of components to be the second color and a color to be used for a rest of the overlapped plurality of components to be the first color, determine the color to be for the overlapped plurality of components to be the second color.

10. An information processing method comprising:
first determining, by at least one processor, for determining for each of a plurality of polygons, a color to be used when each of the polygons is projected, based on a distance between a position of each of the polygons and a slice plane, said distance being calculated by the at least one processor, second determining, for each of the plurality of polygons, the color to be used when each of the polygons is projected, based on the distance between the position of each of the polygons and the slice plane, and a projecting unit configured to two-dimensionally project each of the plurality of polygons in a color determined for each of the plurality of polygons, wherein the first determining unit is further configured to:

define a first color as a color that is a same as a background color and a second color as a color that is different from the background color, determine a color to be used for a polygon that is located at a near side of the slice plane being determined to be the first color;

classify the polygons that are located on a far side of the slice plane along the projecting direction into polygons that are not viewable and facing in the projecting direction and polygons that are viewable and facing in a direction opposite to the projecting direction;

determining a color to be used for the polygons that are facing in the projecting direction to be the first color;

determining a color to be used for the polygons that are facing in the direction opposite to the projecting direction to be the second color, wherein the second determining unit is further configured to:

when a three-dimensional shape includes a plurality of components and the polygons overlap with each other at the plurality of components, if the first determining unit determines a color to be used for at least one of the overlapped plurality of components to be the second color and a color to be used for a rest of the overlapped plurality of components to be the first color, determine the color to be for the overlapped plurality of components to be the second color.

11. A non-transitory recording medium storing a program which, when executed by at least one processor, causes the at least one processor to carry out the information processing method according to claim 10.

* * * * *